United States Patent [19]
Fritsch

[11] 3,798,999
[45] Mar. 26, 1974

[54] MULTI-SPEED TRANSMISSION
[75] Inventor: Felix Fritsch, Vienna, Austria
[73] Assignee: Cincinnati Gear Company, Cincinnatic, Ohio
[22] Filed: July 10, 1972
[21] Appl. No.: 270,381

[30] Foreign Application Priority Data
July 8, 1971  Austria............................ 5936/71

[52] U.S. Cl....................... 74/674, 74/705, 74/761
[51] Int. Cl....................... F16h 37/06, F16h 57/10
[58] Field of Search ............. 74/674, 705, 760, 761

[56] References Cited
UNITED STATES PATENTS
2,589,118   3/1952   O'Leary.................. 74/674
2,917,948   12/1959  Nussbaumer..................... 74/705 X
3,109,324   11/1963  Locher............................. 74/674 X Primary Examiner—Arthur T. McKeon
Attorney, Agent, or Firm—Wood, Herron & Evans

[57] ABSTRACT

A multi-speed transmission comprises a plurality of planetary gear trains which are connected to each other and connected between an input shaft and an output shaft. All of said planetary gear trains are coupled to the input shaft. At least one of said planetary gear trains is adapted to be braked.

6 Claims, 2 Drawing Figures 3,798,999

MULTI-SPEED TRANSMISSION

SUMMARY OF THE INVENTION

A multi-speed transmission comprises a plurality of planetary gear trains, which are connected to each other and connected between an input shaft and an output shaft. In a view taken from the output side in the direction opposite to that in which power is transmitted, the planetary gear trains are disposed one beside the other. The output shaft of each planetary gear train is connected to the output shaft of the transmission. One of said planetary gear trains is connected on its input side to a mechanical drive power source. At least one shaft of the gear trains is adapted to be braked.

In change-speed transmissions it is generally known and conventional to use coupled gear trains, i.e., two or more planetary gear trains having free shafts which in part are interconnected.

The present invention provides a multi-speed transmission which enables a selection of either of two speeds and enables in its low-speed position a sharing of power between two power-transmitting paths.

It is desirable to provide two planetary spur gear trains, each of which comprises a central or sun gear, a ring or internal gear surrounding said sun gear, and at least one planet pinion disposed between and in mesh with said sun gear and internal gear and mounted on a rotatable planet carrier, the internal gears being operatively interconnected.

According to another feature of the invention, the mechanical drive power source is connected to the sun gear or internal gear of one planetary gear train, and two brake power sources are respectively connected to said sun gear and internal gear of the other planet pinion.

Figure 1:
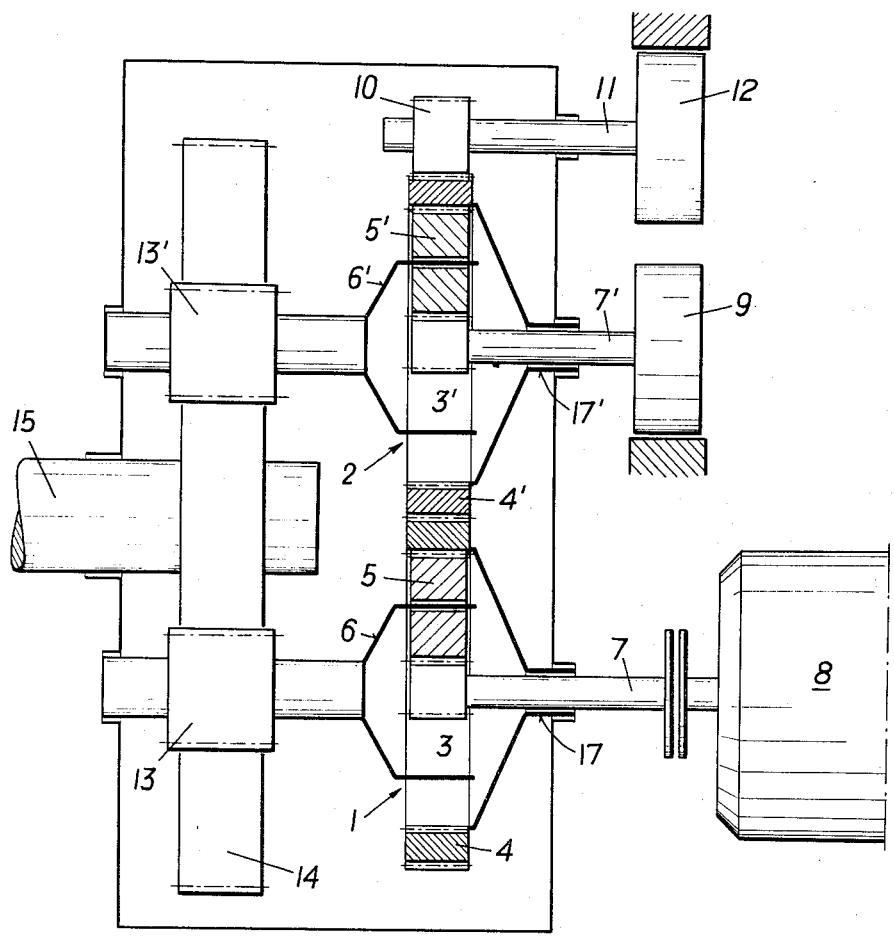
Figure 2:
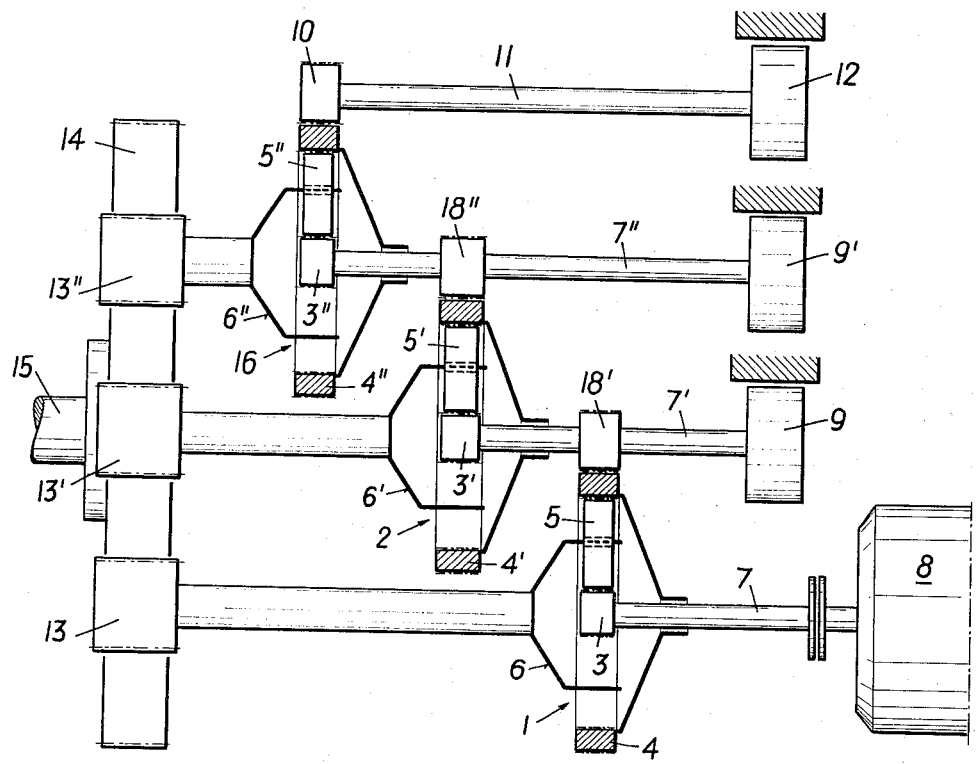

Further details of the invention will be explained more fully with reference to the diagrammatic drawing, in which FIG. 1 shows a two-speed transmission and FIG. 2 shows a three-speed transmission embodying the invention.

The embodiment shown in FIG. 1 comprises two planetary gear trains 1, 2, each of which comprises a central or sun gear 3 or 3', a ring or internal gear 4 or 4', and at least one planet pinion 5 or 5', which is disposed between and in mesh with the sun gear 3 or 3' and the internal gear 4 or 4'. Each planet pinion is freely rotatably mounted on an associated planet carrier 6 or 6'. The internal gears 4 and 4' are in mesh with each other and for this purpose are provided with external teeth in addition to their internal teeth, which are in mesh with the planet pinions 5 and 5'. The sun gear 3 is carried by a shaft 7, which is coupled to a prime mover 8. The shaft 7' of the sun gear 3' of the second planetary gear train 2 is connected to a brake disc 9. The internal gears 4 and 4' are freely rotatably mounted on the shafts 7 and 7', respectively, of the sun gears 3 and 3'. A shaft 11 carries another brake disc 12 and also carries a pinion 10, which is in mesh with the external teeth of the internal gear 4' and is thus operatively connected also to the internal gear 4. In that case, the braking disc 12 can lock the shaft 17' of the internal gear 4' and the shaft 17 of the internal gear 4. The same locking effect can be accomplished by a brake mounted on the shaft 17 of the internal gear 4. Pinions 13 and 13' are driven by the planet carriers 6 and 6' of the two planetary gear trains 1, 2 directly or through the intermediary of additional transmission stages and are in mesh with a common gear 14, which is operatively connected to an output shaft 15 of the transmission directly or also through the intermediary of additional stages.

The transmission has the following mode of operation:

In the first-speed position, the brake consisting of the brake disc 9 is applied and the brake consisting of the brake disc 12 is lifted. By means of the sun gear 3, the prime mover 8 drives the planet carrier 6 and, in the opposite sense of rotation, the internal gear 4. The internal gear 4 transmits its rotation to the internal gear 4' and through the brakelocked sun gear 3' to the planet carrier 6'. The pinion 10 and the brake disc 12 idle. In this position, both pinions 13 and 13' transmit power through the gear 14 to the output shaft 15.

In the second-speed position, the brake consisting of the brake disc 12 is applied and the brake consisting of the brake disc 9 is lifted. In this position, the motor 8 drives by means of the sun gear 3 only the planet carrier 6 whereas the internal gear 4 is brake-locked by the internal gear 4', the pinion 10 and the brake disc 12. Power can then be transmitted only from the pinion 13 through the gear 14 to the output shaft 15. The rotating gear 14 drives the pinion 13', and the rotation of the latter is transmitted, without an accompanying transmission of power, through the intermediary of the planet carrier 6' to the sun gear 3' and the idling brake disc 12.

If the two planet wheels have the same transmission ratio and the pinions 13 and 13' are equal in diameter, the speeds obtained in the two speed positions have a ratio of 1:2. Whereas the transmission may be designed for different speed ratios, optimum conditions will be obtained if the two speeds are related approximately as 1:2.

Special advantages of the proposed design reside in that in the first-speed position, where a high torque is exerted on the output shaft, e.g., twice the torque exerted in the second-speed position, the circumferential force is transmitted to the gear 14 by two pinions 13 and 13'. In the second-speed position, the circumferential force is smaller and transmitted only by one pinion 13. Hence, in its firstspeed position the transmission acts as a gear transmission in which power is shared between two power-transmitting paths. This arrangement affords also the advantage that the power is shared between two meshing couples whereas a large transmission ratio is obtained. In this case, the effective transmission ratio between the prime mover shaft and the two shafts of the pinions 13 and 13' is equal to the sum of the transmission ratios of the two planetary gear trains.

If the transmission ratio of the planetary gear train 1 between the sun gear 3 and the planet pinion 5, with the internal gear 4 locked, is $i_1 = 6$, the transmission ratio between the pinion 13 and the gear 14 is $i_2 = 5$, the prime mover speed is $n = 900$ r.p.m., and the torque exerted by the motor is $M_1$, the transmission will produce in the first-speed position, in which the power is transmitted by both planetary gear trains 1 and 2 and both pinions 13, 13' with respective torques of $6M_1$, a speed $n = -90$ r.p.m. of the internal gear 4 and a speed $n = 900/6 - 90 \times 5/6 = 75$ of the pinion 13. The torque exerted on the output shaft will be $M = 60 \times M_1$, and the output shaft will rotate at a speed $n = 75/5 = 15$.

The speed of the internal gear 4' will be 90 r.p.m., analogous to that of the internal gear 4. The brake disc 12 will idle at a speed $n = 450$ r.p.m. and the brake disc 9 will be locked ($n = 0$, $M = M_1$).

The transmission ratio obtained in the first speed position is 60 and that obtained in the second speed position is 30. In the latter position, the brake disc 12 is locked and the brake disc 9 rotates at a speed $n = 900$ r.p.m. and the pinion 13 at a speed $n=900/6=150$. When the internal gear 4 is locked ($n = 0$), power will be transmitted only by one planetary gear train 1 and the pinion 13 with the torque $6M_1$. Thus the output shaft will rotate at a speed $n=150/5=30$ and exert a torque $M = 30\ M_1$.

Because both pinions 13 and 13' can act on the gear 14 at the same time, the latter may be small, light in weight, and inexpensive compared to a gear which would mesh with only one drive pinion. The latter advantage is of great significance in the manufacture of large-size transmissions.

The two speed positions are selected only in that the two brakes are applied and lifted. These brakes may preferably be disposed outside the transmission housing so that they are accessible for servicing. All gears disposed within the transmission remain permanently in mesh. There are no clutches. Owing to these features, the proposed transmission is most reliable in operation. Beside their shifting function, the two brakes serve also as a transmission brake, which is conveniently associated in many cases with the prime mover shaft. The transmission cannot move when both brakes are applied so that there is no need to associate an additional stop brake with the prime mover shaft.

Various changes in design may be adopted within the scope of the invention. For instance, the prime mover may be connected to the internal gear rather than to the sun gear. Any desired number of planet pinions may be selected. Depending on the desired number of speeds more than two planetary gear trains may be provided. The coupling of the planetary gear trains may be selected as desired.

It will be desirable for all transmissions that the gear to be driven, which is connected to the output shaft of the transmission directly or by additional speed-reducing gear trains, is in mesh with pinions equal in number to the speed positions. In the lowest-speed position, where the lowest output speed and the largest output torque are obtained, the transmission of power is shared by all pinions. In the next higher speed position, the number of pinions which transmit power is decreased by one and so forth, and in the uppermost speed position only one pinion transmits power. Besides, one shaft of each planetary gear train must be operatively connected to one pinion directly or through speed-reducing gear trains, and one shaft of each planetary gear train must be operatively connected to a shaft of an adjacent planetary gear train. Finally, one shaft of each planetary gear train must be adapted to be locked by a brake or the like.

The three-speed transmission shown in FIG. 2 comprises planetary gear trains 1, 2, and 16 and differs from the two-speed transmission in that the internal gears are not in mesh with each other, but the two internal gears of the planetary gear trains 1 and 2 are in mesh, respectively, with pinions 18' and 18" on the shafts of the sun gears 3' and 3" of the succeeding planetary gear trains 2 and 16. To save space, two internal gears, specifically, the internal gears 4, 4', might be connected and the pinion 18' be omitted. In this case, however, the connection between the internal gear 4' and the pinion 18" would have to be retained. To enable a braking of a shaft of each planetary gear train, an additional braking disc 9' is provided, and the connections between the brake discs and the internal gears and the remaining arrangement are similar to the arrangement in the two-speed transmission. For the sake of clearness, the parts of the third planetary gear train are designated with the same reference characters as the corresponding parts of the preceding planetary gear trains, succeeded by two inverted commas ('').

Alternatively, one of the planetary gear trains may be replaced by a clutch. In a three-speed transmission, e.g., the planetary gear train 16 could be replaced by a clutch connected between the pinions 18" and 13" whereas the pinion 10 and the brake 12 would then be omitted.

What is claimed is:

1. In a multi-speed transmission having an input shaft, an output shaft and a plurality of planetary gear trains operatively connecting said input shaft to said output shaft, there being means for braking at least one of said planetary gear trains, and said planetary gear trains being disposed one beside the other as viewed from the output side opposite to the direction in which power is transmitted, the improvement comprising an output pinion associated with each of the respective planetary gear trains, a common gear operatively connected to said output shaft, all output pinions of the respective planetary gear trains being in mesh with said common gear, and each of said planetary gear trains having a planet carrier in driving connection with the output pinion associated therewith.

2. A multi-speed transmission as set forth in claim 1, characterized in that each of the series of planetary gear trains comprises a shaft which is operatively connected to a shaft of an adjacent planetary gear train.

3. A multi-speed transmission as set forth in claim 1, which comprises two planetary spur gear trains, each of which comprises a sun gear, an internal gear surrounding said sun gear, and at least one planet pinion, which is disposed between and in mesh with said sun gear and said internal gear and mounted on a rotatable planet carrier, said internal gears being operatively interconnected.

4. A multi-speed transmission as set forth in claim 1, in which the input shaft is connected to a sun gear of one of the planetary gear trains, and braking means are connected to a sun gear and an internal gear of another planetary gear train.

5. A multi-speed transmission as set forth in claim 1, in which each of the internal gears of all planetary gear trains comprises internal and external teeth, and adjacent internal gears are constantly in mesh with each other.

6. A multi-speed transmission as set forth in claim 1, in which a planetary gear train which is braked comprises an internal gear which is externally in mesh with a pinion that is connected to a brake disc.

* * * * *